Aug. 1, 1967    H. MORTON    3,334,223
MINER'S CAP LAMPS
Filed Feb. 23, 1965    5 Sheets-Sheet 1
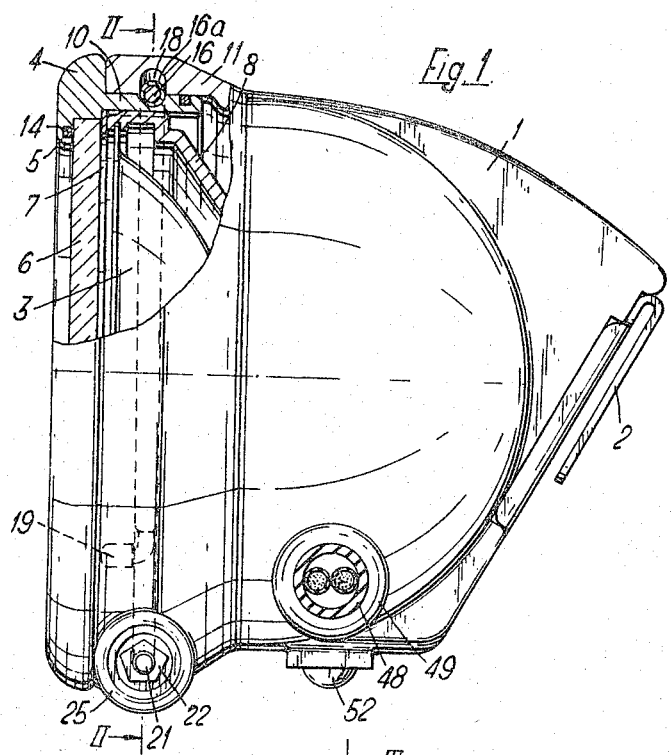
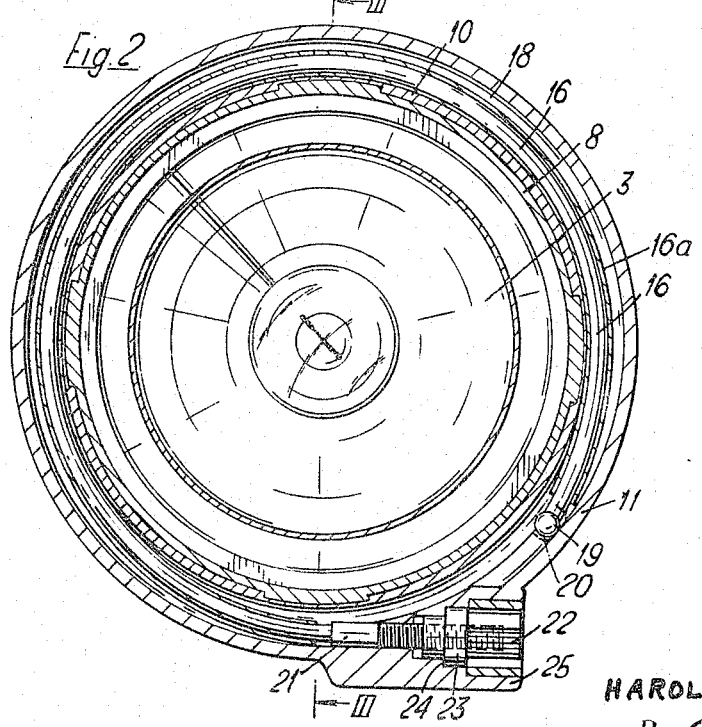
Inventor
HAROLD MORTON
By
Attorneys

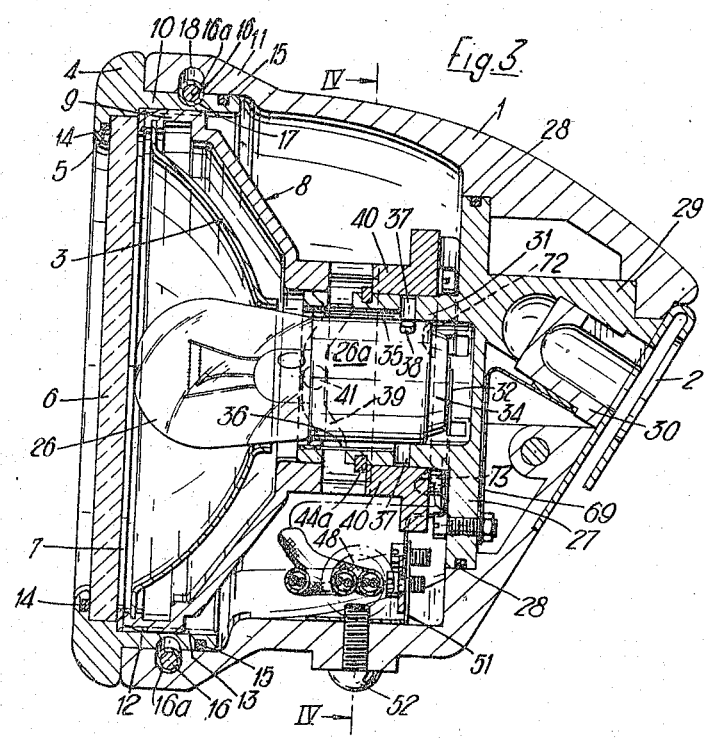
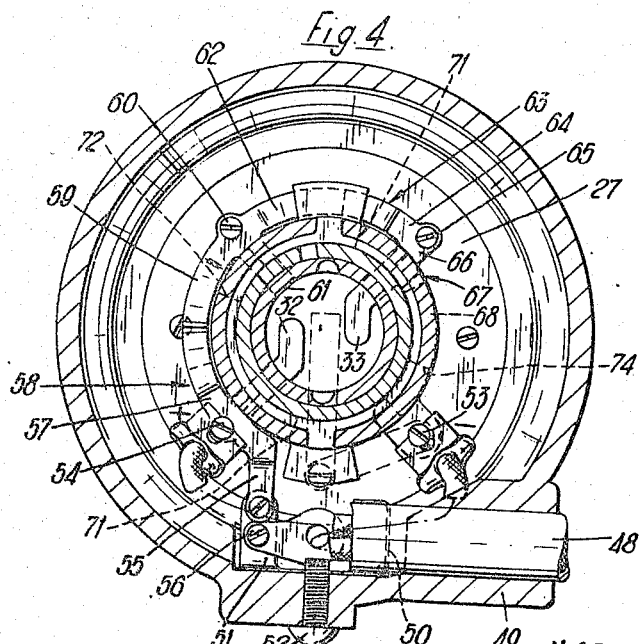

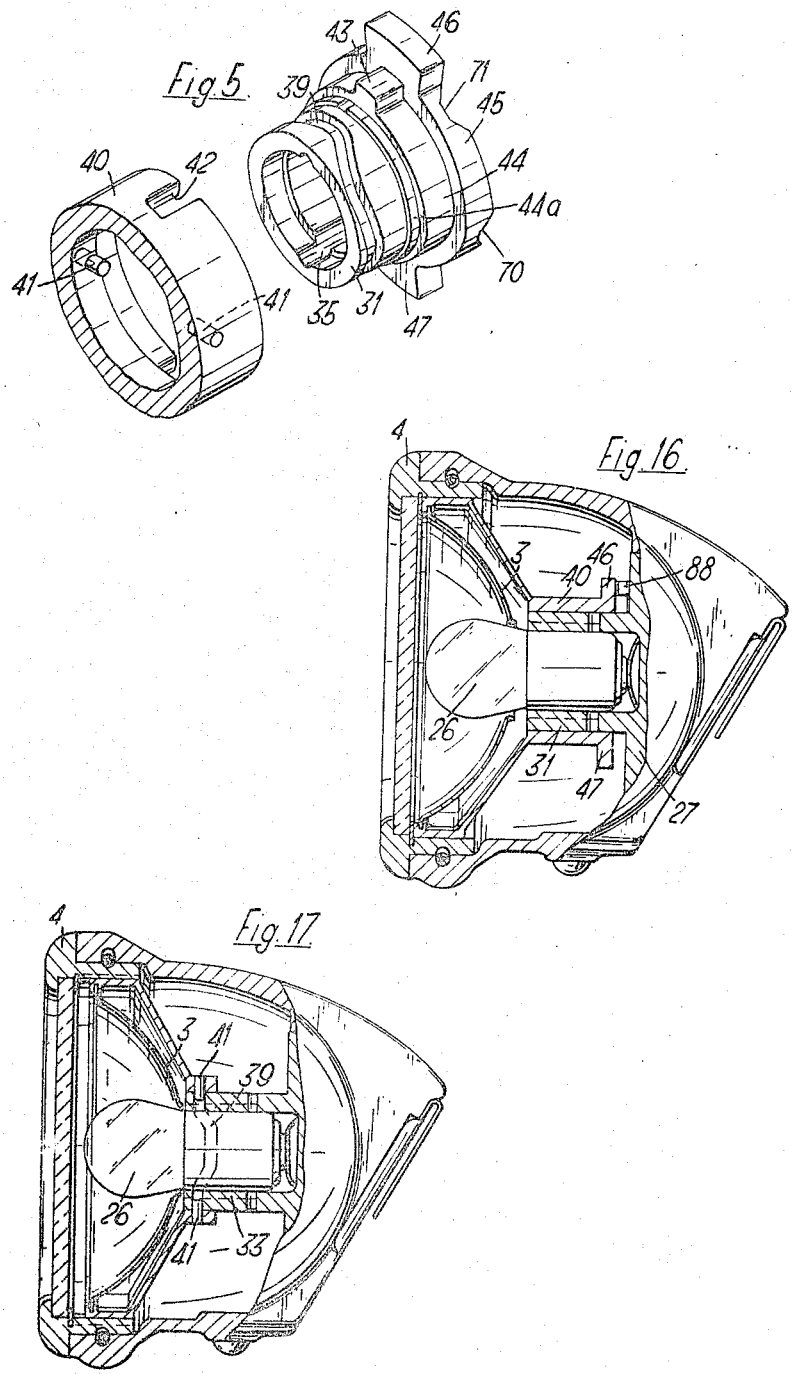

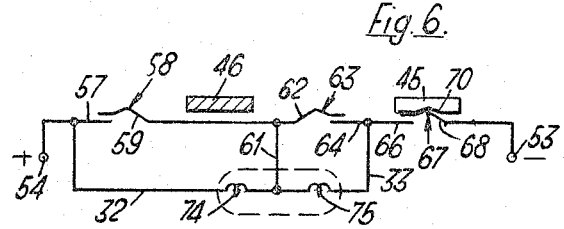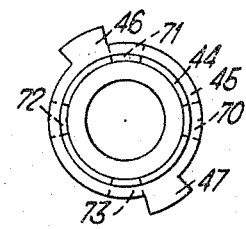
Fig.6.
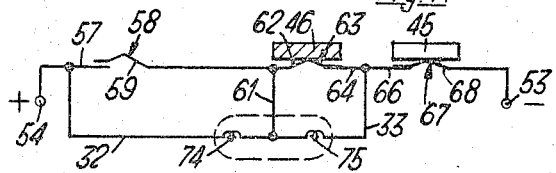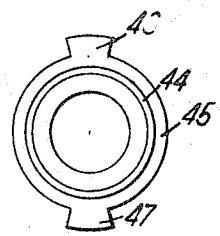
Fig.7.
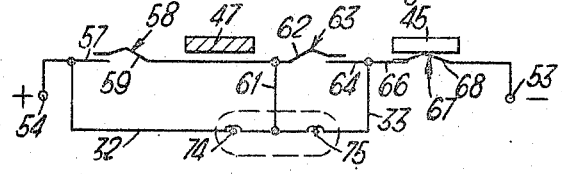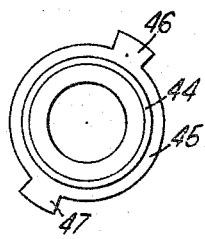
Fig.8.
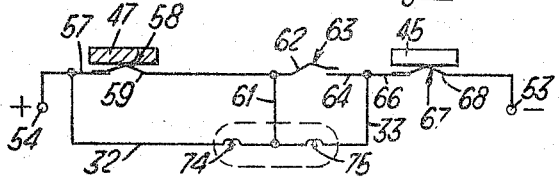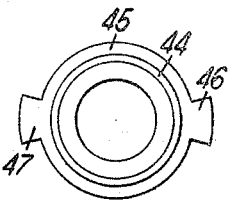
Fig.9.
Inventor
HAROLD MORTON Aug. 1, 1967   H. MORTON   3,334,223
MINER'S CAP LAMPS
Filed Feb. 23, 1965   5 Sheets-Sheet 5
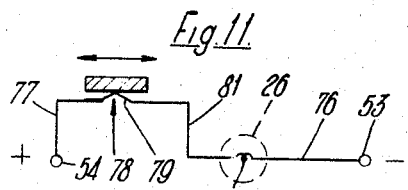
Fig. 11.
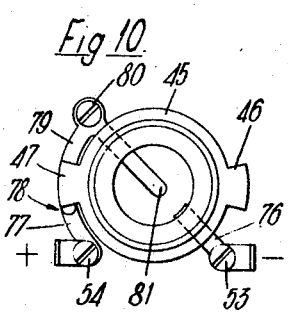
Fig. 10.
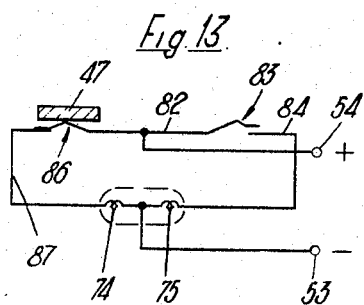
Fig. 13.
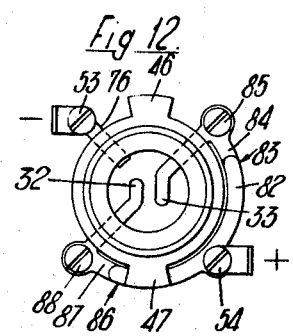
Fig. 12.
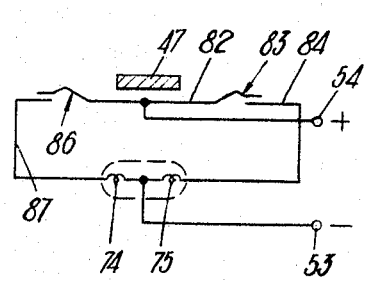
Fig. 14.
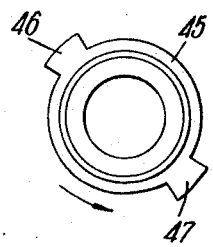
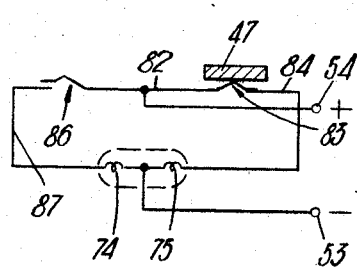
Fig. 15.
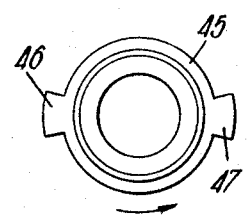
Inventor
HAROLD MORTON
By Imirie & Smiley
Attorneys

United States Patent Office 3,334,223
Patented Aug. 1, 1967

3,334,223
MINER'S CAP LAMPS
Harold Morton, Manchester, England, assignor to Oldham & Son Limited, Manchester, England, a company of Great Britain
Filed Feb. 23, 1965, Ser. No. 434,275
Claims priority, application Great Britain, Feb. 21, 1964, 7,431/64
7 Claims. (Cl. 240—11.3)

This invention relates to miner's cap lamps.

It is a main object of the present invention to provide an improved miner's cap lamp in which switching and/or focussing functions are simply performed without the provision of projecting members such as knobs on the exterior of the body of the cap lamp, which projections have always been subject to damage in the known kinds of cap lamps.

A further object of the invention is to provide a cap lamp with a new switching arrangement which prolongs the life of a bulb in the lamp.

According to the invention there is provided a miner's cap lamp comprising a lamp body, a reflector mounted in the body, a lens ring rotatably mounted on the front of the lamp body, which ring holds a glass closing the front of the lamp, and adjustable means in the lamp for controlling the functioning of the lamp, which adjustable means is connected to the rotatable lens ring so that the output from the lamp is controllable by rotation of the ring.

In order to provide focussing facilities the bulb is held in a mounting including a back plate fixed in the lamp body, a rotatable member holding the reflector and connected to the lens ring, and guide means cooperating with said rotatable member and arranged to cause relative axial movement between the reflector and the bulb rotation of said rotatable member by the ring, thereby varying the focussing of the lamp.

In a preferred embodiment of the invention the bulb is held in a socket fixed to the back plate, guide grooves are formed in the outer surface of the socket curving around its outer surface, and said rotatable member includes a sleeve surrounding the socket and carrying tracking pins projecting from its inner surface, which pins engage in the grooves in the bulb socket, whereby rotation of the lens ring causes the pins to track along the guide grooves thereby causing axial movement of the reflector relative to the bulb.

As well as providing focussing facilities the cap lamp according to the invention includes switching means mounted on the back plate fixed in the lamp body, and including at least one spring contact arranged to be engaged by a base contact on a bulb, and rotatable switch actuating means connected to said rotatable member, whereby the switching of the supply to the bulb is controllable by rotation of the lens ring.

Thus both the switching and the focussing arrangements can be controlled easily by the miner merely by rotating the lens ring on the front of his cap lamp. This is much easier to perform than the arrangements in previous cap lamps which included side knobs and switches, particularly in the cramped conditions underground.

Preferably the switching means includes contacts arranged in a circle on the back plate, which contacts are normally open, a switch actuating member of circular form fixed to the sleeve and co-operating with said contacts and including at least one actuating sector which is arranged to wipe over the contacts, whereby rotation of the lens ring causes said actuating member to wipe over the contacts in sequence thereby performing a sequence of switching operations of the supply to the bulb.

It has been found that a miner will always tend to rotate the lens ring on the improved cap lamp according to the invention in the same direction so that the switching sequence is always carried out in the same order and the switching contacts are worn uniformly.

In the simplest embodiment of a cap lamp with switching means according to the invention the bulb is a single filament bulb, the switching means comprises a single pair of contacts connected between the supply battery and a central spring contact for engagement by the base contact of the bulb, and there are two oppositely disposed actuating sectors on the switch actuating member, whereby the bulb is switched on and off twice during each revolution of the lens ring.

More usually however the bulb is a twin filament bulb, there are two spring contacts on the back plate respectively for engagement by the two base contacts on the bulb, the switching means includes two pairs of contacts, one contact of each pair being connected to a terminal of the supply battery and the other contact of each pair being respectively connected to the two spring contacts, and there are two oppositely disposed sectors on the actuating member, whereby the two filaments are switched on and off alternately twice during each revolution of the lens ring.

With this arrangement according to the invention the two filaments are switched in and out alternately so that each of the filaments is in operation for the same length of time.

A reduced light is sometimes required, for example during meal breaks, and according to another feature of the present invention a reduced light intensity is provided by connecting both the filaments together in series and from this aspect the invention also comprehends a miner's cap lamp wherein the bulb is a twin filament bulb whose filaments are connected in series, two spring contacts are mounted on the back plate respectively for engagement by the two base contacts of the bulb, the switching means includes three pairs of contacts connected in series between the terminals of the supply battery, the two filaments are respectively connected in parallel with a first and a second one of the pairs of contacts, and the switch actuating member includes two oppositely disposed actuating sectors, whereby in one complete revolution of the actuating member by the lens ring a switching sequence is performed twice, in which sequence the first filament is lit, then both filaments are connected in series to the supply battery, then the second filament is lit, and again both filaments are connected in series to the supply.

Although the two functions of switching and focussing are performed by means of a single control, namely the rotation of the lens ring on the front of the cap lamp, they may be adjusted independently, and in order to effect this the switching means is so arranged relative to said guide grooves that the focussing operation takes place between switching operations to provide individual control of the focussing and the switching during the rotation of the lens ring.

Further according to the invention the lens ring has a cylindrical flange one of whose surfaces engages a surface of the mouth of the lamp body, co-operating grooves are formed in said engaging surfaces to define a channel in which a flexible anchor cable is mounted carrying at one end an anchor pin which engages in a seating in the mouth of the lamp, the other end of the cable being held by adjustable means mounted in the mouth of the lamp body and is operable to tighten the cable thereby causing the cable to bind into the groove in the lens ring so that the lens ring is held in the mouth of the lamp body.

In order that the invention may be more clearly understood some embodiments thereof will now be described, by way of example with reference to the accompanying drawings in which:

FIGURE 1 is a side elevation partly in section of a miner's cap lamp according to the invention, FIGURE 2 is a section on line II—II of FIGURE 1, FIGURE 3 is a section on line III—III of FIGURE 2, FIGURE 4 is a section on line IV—IV of FIGURE 3, FIGURE 5 is an exploded view of part of the bulb mounting which is always shown in FIGURE 3, FIGURES 6 to 9 illustrate diagrammatically the positions of an actuating member for the switching means of FIGURES 3 and 5 and the corresponding stages in the operation of the switching circuit of the lamp, FIGURE 10 shows a simple switching arrangement when a single filament bulb is fitted in the cap lamp, FIGURE 11 is a circuit diagram of the switch of FIGURE 10, FIGURE 12 shows another switching arrangement fitted into the lamp for switching a two filament bulb, FIGURE 13 is a circuit diagram of the switch of FIGURE 12, FIGURES 14 and 15 illustrate diagrammatically the positions of the actuating member for the switching means of FIGURES 12 and 13, and the corresponding stages of the switching of the circuit of FIGURE 13, FIGURE 16 is a section similar to FIGURE 3 through a cap lamp according to the invention with switching means but not focussing, and FIGURE 17 is a section similar to FIGURE 16 of a cap lamp according to the invention with focussing arrangements but no switching.

In the drawings the same references indicate the same or similar parts.

Referring to FIGURES 1 to 4 of the drawings, a miner's cap lamp comprises a lamp body 1 which is dome-shaped and is provided with a clip 2 at the rear of the lamp for clipping over a bracket on a miner's helmet. A reflector 3 is mounted in the body 1, and a lens ring 4 is rotatably mounted in the front of the lamp body 1. The outer face of the lens ring is provided with an inturned retaining flange 5 against which a glass 6 which closes the front of the lamp is held by a spring clip 7 in well-known manner.

The reflector 3 is held in a mounting indicated generally at 8 and including a short annular sleeve 9 which fits loosely inside an inwardly projecting cylindrical part 10 of the lens ring. The front of the lamp body is specially shaped to receive the cylindrical part 10 of the lens ring, the front of the lamp being formed as an outwardly flared mouth 11 the inner surface of which is of cylindrical form to match the outer surface of the cylindrical part 10 of the lens ring.

The outer surface of the sleeve 9 is formed with projections 12 which are slidable in keyways 13 cut in the inner surface of the lens ring part 10, so that while the sleeve 9 and the reflector are rotated with the lens ring, the reflector 3 can slide axially relative to the lens ring.

A groove is cut in the inner face of the flange 5 and a sealing ring 14 is seated in the groove so that the glass 6 is sealed against the lens ring 4.

There is also a groove in the outer surface of the cylindrical part 10 of the lens ring. A sealing ring 15 is located in that groove to provide a seal between the lamp body 1 and the lens ring 4.

The lens ring 4 is held onto the mouth 11 of the lamp body by an anchor cable 16 which is located in a channel defined by a groove 17 in the outer surface of the cylindrical part 10 of the lens ring and in a cooperating groove 18 in the inner surface of the mouth 11 of the lamp body. As is shown in FIGURE 3 the depth of the groove 18 is such as to permit some radial movement of the anchor cable 16 in the channel. The cable 16 has an outer sheath 16a of a synthetic resin material, for example polyvinyl chloride.

One end of the cable 16 carries an anchoring pin 19 which engages in a curved slot 20 in the mouth 11 of the lamp body (see FIGURE 2). The other end of the cable 16 is fixed to a threaded rod 21 which is screwed through a locking nut 22 having a flange 23 which bears against an abutment face 24 of a bushing 25 formed in the mouth 11 of the lamp body. The locking nut 22 is a special five-sided nut which can only be turned with a special key, thereby greatly reducing the risk of the lamp being opened and tampered with.

When the cut 22 is turned so that the rod 21 is drawn into the nut, the anchoring pin 19 is drawn against one end of the slot 20 and the cable 16 is tightened into the groove 17 in the cylindrical part 10 of the lens ring 4. The cable sleeve 16a still bears against the edges of the groove 18 in the mouth 11 of the lamp body, and so binds the lens ring 4 to the mouth 11 of the lamp body. The tightness of the cable 16 in the groove 17 determines the resistance of the lens ring 4 to rotation on the front of the cap lamp, because of the friction of the cable sleeve 16a against the edges of the groove 17 as the lens ring is rotated. If the lens ring 4 has to be removed when servicing the lamp, the cable 16 is slackened by turning the nut 22 and the cable 16 slackens outwardly into the groove 18 in the inner surface of the mouth 11 of the lamp body. The lens ring 4 can then be removed from the mouth 11 of the lamp body.

The bulb 26 of the lamp is, in a preferred embodiment of the invention, a two filament bulb, and it is held in a mounting including a back plate 27 fixed in the lamp body 1 (see FIGURE 3). The back plate 27 is circular and is formed with an edge groove in which a sealing ring 28 is seated to provide a seal at the back of the lamp. The plate 27 is moulded with a backward extension 29 which is shaped to fit into the back of the lamp body 1 and to provide a seating for a socket 30 which is a connection for a charging plug on a charging frame, in known manner.

There is a forwardly extending flange 31 of cylindrical form on the front of the back plate 27, which flange defines a bulb socket fixed to the back plate 27. Two spring contacts 32 and 33 are mounted on the back plate 27 inside the socket 31 and terminals, one of which is shown at 34, at the bottom of the bulb 26 contact these spring contacts 32 and 33. The bulb socket 31 has two axial grooves 35 and 36 in its inner surface, which grooves 35 and 36 terminate in circumferential slots 37 in which the usual holding pins 38 on the base of the bulb are held when the bulb is pushed down into the socket and then rotated in the socket.

An inclined guide groove 39 is formed in the outer surface of the bulb socket 31 and this groove 39 curves sinuously around the outer surface of the socket. A sleeve 40, which is a part of the reflector mounting 8, surrounds the socket 31 and carries tracking pins 41 projecting inwardly from its inner surface. The pins 41 engage in the guide groove 39 in the socket 31.

When the lens ring 4 is rotated the sleeve 40 rotates and because of the keying of the sleeve 9 to the lens ring part 10, the pins 41 are able to track along the guide groove 39 thereby causing axial movement of the sleeve 40 and therefore of the reflector 3 towards and away from the back plate 27. During this movement the projections 12 on the sleeve 9 slide in the keyways 13 in the lens ring part 10. This adjusts the position of the focal point of the reflector relative to the filaments of the bulb 26, so that the output from the lamp can be a focussed beam of light or a diffused beam of light as required.

The sleeve 40 is formed with diametrically opposite slots 42 in its back face (see FIGURE 5), which slots 42 engage over co-operating bosses 43 formed on a cylindrical flange 44 of a rotatable switch actuating member including an annular part 45 provided with two switch actuating sectors 46 and 47 which are arranged to wipe over the spring contacts of switches fixed to the back plate 27. The cylindrical flange 44 fits over the bulb socket 31 and is retained in position by a spring clip 44a (see FIGURE 3).

By the engagement of the slots 42 over the bosses 43 the switch actuating member rotates when the lens ring 4 is rotated.

A preferred switching arrangement for a two filament bulb is illustrated in FIGURE 4. A cable connecting the lamp to its supply battery is indicated at 48 and passes through a cable duct 49 in the side of the lamp body (see FIGURES 1 and 4). The cable 48 fits tightly into the cable duct 49 and is held inside the lamp body 1 by a cable clip 50 integral with a bracket 51 which is fixed to the base of the lamp body by a screw 52. One line of the cable is connected to a terminal 53 and the other line to a terminal 54.

The terminal 54 fixes a three-armed connection strip to the base plate 27. One arm of the strip forms the central spring contact 32 which is engaged by terminal on the base of the bulb 26. The second arm 55 is connected by a screw 56 to the bracket 51 and so is in electrical connection with the stud head of the screw 52 which forms the second charging terminal. The third arm 57 of the strip forms the lower contact of a switch 58, whose upper contact is a connection strip 59 of arcuate form bent outwardly from the base plate 27 in the form of a V in the manner indicated in FIGURES 6 to 9. The strip 59 is fixed to the back plate 27 by a screw 60 and has integrally formed with it an inwardly and upwardly extending contact 61 which engages the side wall 26a of the base of the bulb 26.

The connection strip 59 is extended on the other side of the screw 60 to form an upper contact 62 of a second switch 63, whose lower contact 64 is a part of a further connection strip which is fixed to the back plate 27 by a screw 65. The strip 62 is also bent outwardly from the base plate 27 in V-form.

The central spring contact 33 is integral with the contact 64 and an inturned lower contact 66 of a third switch 67. The upper contact of the switch 67 is formed by one end of yet another arcuate connection strip 68 which is fixed to the back plate 27 by the terminal screw 53.

The strip 68 is bent outwardly from the back plate 27 in the form of a V, and the contacts 66 and 68 of the switch 67 are positioned under the central annular part 45 of the switch actuating member. The terminal screw 53 extends through the back plate 27 and is connected by conductors 69 to the socket 30 for the charging frame jack plug (see FIGURE 3).

Referring now to FIGURES 6 to 9, there are four notches 70, 71, 72 and 73 in the bottom face of the annular part 45 of the switch actuating member, which notches accommodate the upwardly bent contact strip 68 as the part 45 is rotated. When the upwardly bent strip 68 is accommodated in one of the notches the switch 67 is open, but in all other positions of the switch actuating member the switch 67 is closed by the pressure of the part 45 on the strip 68.

The two projecting sectors 46 and 47 sweep over the switches 58, 63 and 67 as the lens ring 4 is rotated. As shown in the circuit diagram of FIGURE 6, the two filaments 74 and 75 of the bulb 26 are connected in series, and the junction of the series-connected filaments is connected to the wall 26a of the bulb which is engaged by the contact 61.

The switching sequence of the lamp is illustrated in FIGURES 6 to 9 which show different positions of the switch actuating member and the corresponding modes of connection of the two filaments 74 and 75 of the bulb 26 to the supply terminals 53 and 54.

FIGURE 6 shows a first position of the switch actuating member in which the contact strip 68 of the switch 67 is engaged in the notch 70 in the part 45. The switches 58, 63 and 67 are all open and there is no supply to the filaments 74 and 75. As the lens ring 4 is rotated in the clockwise direction the strip 68 is depressed, and the switch 67 closes so that the supply terminal 53 is connected into the circuits. At the same time the sector 46 engages the strip 62 and closes the switch 63 so that, as shown in FIGURE 7, a circuit is made to the terminal 54 through the filament 74 which then lights. The width of the sector 46 is so related to the arrangement of the guide groove 39 in the bulb socket 31 that the beam of light from the lamp can be fully focussed in this switching position by adjustment of the lens ring within the permissible limits of the switching position.

Further clockwise rotation of the lens ring moves the sector 46 off the strip 62 so that the switch 63 opens; that is the switches 58 and 63 are both open while the switch 67 is closed. This is the position illustrated in FIGURE 8, from which figure it will be seen that both the filaments 74 and 75 are connected in series between the supply terminals 53 and 54. This gives a reduced light output with consequent decrease in the current drain on the battery, the reduced light output being sufficient for use during breaks in work underground.

On further rotation the switch 67 opens when the strip 68 engages in the notch 71, and then at the same time as the sector 47 depresses the strip 59 to close the switch 58 the strip 68 is again depressed to close the switch 67 as the notch 71 moves past the switch 67. This is the position shown in FIGURE 9 in which the filament 75 is connected to the supply and the beam of light can be focussed in this switching position. Further rotation of the lens ring 4 moves the sector 47 off the strip 59 so that switches 58 and 63 are both open again while the switch 67 is still closed, so that once again both the filaments are connected in series to the supply, in the manner shown in FIGURE 8, and give a reduced light output. This completes half a cycle rotation of the lens ring.

Next the notch 72 accommodates the strip 68 so that the switch 67 opens. Then as the notch 72 moves past the switch 67 the sector 47 engages the strip 62 of the switch 63 so that the circuit connection of FIGURE 7 is repeated and the filament 74 is energized. As the sector 47 moves past the switch 63 the two filaments are again connected in series then the circuit is opened when the notch 73 lies over the switch 67, and as the notch 73 moves past the switch 67 the sector 46 depresses the strip 59 and the filament 75 is again connected to the supply. Movement of the sector 46 past the switch 58 restores the circuit to the condition shown in FIGURE 8 in which the two filaments are connected in series, and finally the rotation of the member 45 back to the position shown in FIGURE 6 completes one switching cycle with all the switches open.

In summary, as the lens ring is rotated clockwise first one filament, then both filaments in series, then the other filament, then again both filaments in series are switched to the supply, during each 180° of rotation of the lens ring 4. While the switching sequence is being performed the reflector 3 is being moved axially by the focussing arrangement.

As a miner would always tend to rotate the lens ring of his lamp in the same direction, either clockwise or anti-clockwise, the filaments 74 and 75 are connected alternately to the supply so that the deterioration of the two filaments is uniform. If the lens ring were rotated anti-clockwise the reverse switching sequence would be performed.

When the bulb 26 is a single filament bulb the switching arrangement is simplified as illustrated in FIGURES 10 and 11. The two supply leads are connected to the terminals 53 and 54 as before, and also connected to the terminal 53 there is a connecting strip 76 which runs through the bulb holder and makes contact with the side wall of the base of the bulb. One end of the filament 74 is connected to this side wall. The other terminal 54 has a connection strip 77 attached to it and this connection strip 77 forms the lower contact of a switch 78. An arcuate connection strip 79, which is bent upwardly to form a V-shaped spring contact, forms the other contact of the switch 78, and the strip 79 is fixed to the back plate 27 by a screw 80 and is integral with a spring contact 81 which extends into the centre of the bulb holder to be engaged by the terminal on the base of the single filament bulb. The actuating means 45 has the same two sectors 46 and 47 as described above, and it will be seen that the switch 78 is closed twice by the sectors 46 and 47 during each revolution of the lens ring.

A simplified way of operating the lamp with a two filament bulb is illustrated in FIGURES 12 to 15.

FIGURE 12 shows an arrangement of switching means fixed on the back plate 27, and FIGURE 13 is a circuit diagram of that switching means. There are two terminals 53 and 54 and the terminal 53 is connected to the contact strip 76 which contacts the side wall of the bulb. The two filaments 74 and 75 are connected in series and the terminal 53 is connected to the junction of the two filaments.

The terminal 54 has a contact strip 82 of arcuate form connected to it. Both ends of the strip 82 are formed as spring contacts. One end is the top contact of a switch 83 the bottom contact of which is a part of an angular connection strip 84 which is fixed to the back plate 27 by a screw 85. The other leg of the strip 84 is the central spring contact 33. The other end of the strip 82 is the upper contact of a switch 86 whose lower contact is one arm of a strip 87 fixed to the plate 27 by a screw 88 and whose other arm is the central spring contact 32.

The switch actuating member again has the same two oppositely disposed sectors 46 and 47 and in the position shown in FIGURE 12 the switch 86 is closed by the sector 47. The switch 83 remains open so that the filament 74 is alight.

Rotation of the lens ring 4 moves the switch actuating member to the position shown in FIGURE 14 and leaves both switches 83 and 86 open so that neither filament is lit. Further rotation of the part 45 to the position shown in FIGURE 15 causes the sector 47 to close the switch 83 so that the filament 75 is lit.

On further rotation of the lens ring 4 in the same anti-clockwise direction the switching sequence is repeated by the other actuating sector 46.

In both the single filament arrangement just described with reference to FIGURES 10 and 11, and the two filament switching arrangement described with reference to FIGURES 12 to 15 focusing of the beam of light from the lamp also takes place during each different stage of the switching sequence, and in the same way as described above with reference to FIGURES 1 to 9, the width of the sectors 46 and 47 is so related to the guide groove 39 on the bulb socket as to permit a complete focusing adjustment of the bulb to be carried out in each switching position.

While in the preferred embodiments described above both switching and focusing functions are simultaneously controlled by rotation of the lens ring 4 mounted on the front of the cap lamp, for some applications only one or other of these functions is required to be adjustable.

In FIGURE 16 there is shown a modified cap lamp according to the invention which performs a switching function but no focusing. The bulb 26 is supported in a socket 31 in the same way as described above with reference to FIGURES 3 and 4 and the terminals on the bottom of the bulb engage one or more spring contacts fixed to the back plate 27. The sleeve 40 which forms a part of the reflector mounting 8 carries the switch actuating sectors 46 and 47. The switching contacts mounted on the back plate 27 are indicated at 88 and may be any one of the switching arrangements described above. In this arrangement rotation of the lens ring 4 causes the sectors 46 and 47 to wipe over the switching contacts but this switching is not accompanied by a focusing of a beam of light from the lamp.

A further modification is shown in FIGURE 17 which illustrates a cap lamp which can be focused by rotation of the lens ring 4. There are no switching arrangements connected to the lens ring, but if desired switching of the filaments may be effected by some other switching means. The focusing arrangement is as illustrated in FIGURE 3 and tracking pins 41 engage in a groove 39 in the bulb socket 31. Rotation of the lens ring causes the reflector to move axially relative to the bulb 26 which movement gives the desired focusing of the light beam from the lamp.

To facilitate rotation of the lens ring 4 it preferably has a knurled edge, and by the invention all the necessary adjustments for switching and focusing are effected by a simple rotation of the lens ring. This greatly simplifies the adjustment of the cap lamp in the cramped conditions underground.

Further by the simplified switching and/or focusing arrangements according to the invention the body of the cap lamp can be manufactured as a single moulding and it is not necessary for any metal inserts to be included in the moulding since all the movable parts are contained within the central cavity of the cap lamp between the sealed back plate 27 and the seal 15 of the lens ring 4 against the inside wall of the mouth 11 of the cap lamp body. The only external connections possible to the lamp are those necessary for charging purposes, namely through the jack plug socket 30 and the stud 52 in the bottom of the lamp body.

The mounting 8 which holds the reflector may be formed as a spider of ribs connecting the sleeve 9 to the sleeve 40. In another modification of the cap lamp the part of the reflector mounting which connects the sleeves 9 and 40 may be of parabolic shape and the reflector 3 is formed by a reflecting coating which is deposited on this shaped part.

Further any of the embodiments described may be modified so that the sleeve 9 is fixed to the lens ring for rotation therewith, while the bulb socket 31 is axially slidable relative to the base plate 27, so that rotation of the lens ring causes axial movement of the bulb relative to the reflector to give the desired adjustable focusing of the beam of light from the lamp.

I claim:

1. A miner's cap lamp comprising a lamp body, a lens ring rotatably mounted on the front of said lamp body, a glass closing the front of the lamp and held by said lens ring, a first rotatable member coupled for rotation with said lens ring, a reflector on and movable with said first rotatable member, a back plate fixed in the lamp body, a bulb socket fixed to said back plate, a bulb held in said socket, a sleeve extending from said first rotatable member and surrounding said socket, interengaging guide means on said socket and sleeve for causing relative axial movement between said socket and sleeve on relative rotation therebetween, the relationship of axial movement to rotation provided by said guide means allowing the lamp to be fully focused by rotating said lens ring through a predetermined angle, the cap lamp further comprising a switching arrangement including a switch actuating member rotatable by said first rotatable member, said switch actuating member having at least one actuating sector, and at least one pair of contacts arranged on said back plate which contacts are normally open but which are closable by said actuating sector to connect a filament of said bulb to electrical supply terminals, the angular width of said actuating sector being such that said sector holds said contacts closed during rotation of the lens ring through said predetermined angle.

2. A miner's cap lamp according to claim 1, wherein the contacts are arranged in a circle on the back plate, whereby rotation of the lens ring causes said actuating sector to wipe over, and thereby to close, the contacts in sequence thereby performing a sequence of switching operations between the bulb and the electrical supply terminals.

3. A miner's cap lamp according to claim 2, wherein the switch actuating member has at least two actuating sectors, whereby the sequence of operations is performed twice during one revolution of the lens ring.

4. A miner's cap lamp according to claim 3, wherein the bulb is a twin filament bulb having two base contacts one of said contacts being connected to each filament, and wherein there are two spring contacts on the back plate respectively for engagement by said base contacts of the bulb, said switching means including two pairs of contacts, one contact of each pair being connected to an electrical supply terminal and the other contact of each pair being respectively connected to said two spring contacts, whereby the two filaments are alternately connected to the electrical supply terminals twice during each revolution of the lens ring.

5. A miner's cap lamp according to claim 3, wherein the bulb is a twin filament bulb having two base contacts one of said contacts being connected to each filament, said filaments being connected in series, and wherein there are two spring contacts mounted on the back plate respectively for engagement by said base contacts of the bulb, said switching means including three pairs of contacts connected in series between the electrical supply terminals, the two filaments being respectively connected in parallel with a first and a second one of said pairs of contacts, whereby in one complete revolution of the actuating member by the lens ring a switching sequence is performed twice, in which sequence the electrical supply terminals are firstly connected to a first of said filaments, and then to both filaments in series, then to a second of said filaments, and again to both filaments in series.

6. A miner's cap lamp according to claim 1, wherein the lens ring and the lamp body have interengaging cylindrical surfaces, said interengaging surfaces having cooperating grooves defining a channel, and further comprising a flexible anchor cable mounted in said channel, an anchor pin at one end of the said cable which engages in a seating in the mouth of the lamp, and adjustable means mounted in the mouth of the lamp body holding the other end of the cable and operable to tighten the cable thereby causing the cable to bind into the groove in the lens ring so that the lens ring is held in the mouth of the lamp body.

7. A miner's cap lamp comprising, in combination,
a lamp body,
a cover assembly rotatably mounted on the front of said lamp body and including a transparent member,
a light source fixed within said body behind said transparent member,
a reflector assembly carried by said cover assembly for rotation therewith and through which reflector assembly said light source projects,
means for axially shifting said reflector assembly relative to said light source in response to rotation of said cover assembly within a predetermined angular sector fully to focus the lamp,
and normally open switch means adapted to be closed for energizing said light source in response to rotational movement of said cover assembly into and within the confines of said predetermined angular sector.

References Cited
UNITED STATES PATENTS

| | | | |
|---|---|---|---|
| 1,415,555 | 5/1922 | Hawthorne | 240—44.27 |
| 2,069,950 | 2/1937 | Greppin | 240—1.4 |
| 2,301,353 | 10/1942 | Zimmer | 240—44.1 |

NORTON ANSHER, *Primary Examiner.*

WYNDHAM M. FRYE, *Assistant Examiner.*